Figure 1:
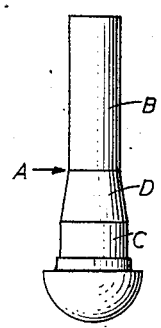

Jan. 27, 1948.  P. KUBICKI  2,435,144
RIVET
Filed Dec. 22, 1944

INVENTOR
Piotr Kubicki.
BY
William C. Linton.
ATTORNEY

Patented Jan. 27, 1948

2,435,144

UNITED STATES PATENT OFFICE 2,435,144

RIVET

Piotr Kubicki, London, England

Application December 22, 1944, Serial No. 569,360
In Great Britain June 6, 1944

2 Claims. (Cl. 85—40)

This invention relates to rivets for use in compression riveting of the kind comprising a headed core secured in a headed tubular member or sleeve, the said member or sleeve being collapsed or upset to form a head by the axial movement of the said core therein.

Such rivets are of especial use in the aircraft industry.

In a rivet of the kind set forth the core is secured to the tubular member by welding or otherwise fixing the end of the said member to the underside of the head of the core and in so doing there is usually left a slight annular space between the core and the wall of the member. This annular space may be increased when axial movement has been imparted to the core for the reason that the only satisfactory method of effecting this movement is to draw the core through the tubular member whilst exerting an opposing thrust thereagainst. This drawing reduces the diameter of the core.

It has been found in practice that when these spaces have been left there is a tendency that the stress is only taken up by the tubular member and the core becomes useless. This is a distinct disadvantage to the use of such rivets.

The object of this invention is to provide an improved construction of rivet whereby the above mentioned disadvantage is obviated.

According to this invention a rivet of the kind set forth is characterised in that both the core and tubular member or sleeve are formed with tapered portions so positioned that when axial movement is imparted to the former the said tapered portions mate and close up and prevent any annular space therebetween and also between the tubular member and the walls of the rivet holes.

The said tapered portions may extend over the whole or only a part of each of said core or said tubular member or sleeve but should have a length, at least, equal to that of the thickness of the parts to be riveted and the coincidence of length and taper be such as to permit during the process of riveting, for the tubular member to be first collapsed to form the head and later effect the expanding of the tubular member or only simultaneously with the final collapsing of the rivet head to materially reduce the riveting forces that would be required wherein the steps of collapsing and expanding all occur at the same time.

It will be therefore apparent that the core and tubular member may be made from the same material for not only reducing their cost of manufacture, but to permit the same to be more easily welded together and yet permit the fluid metals caused during the riveting process to more readily adhere together when filling the gap or space therebetween whereby the core and tubular member will be permanently secured together to form a blind rivet which will be as near to an ordinary solid rivet as one may expect to obtain.

Figure 3:
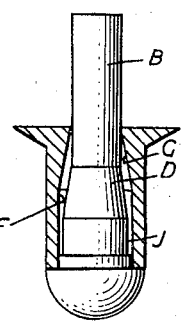
Figure 2:
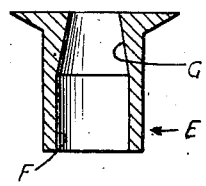
Figure 4:
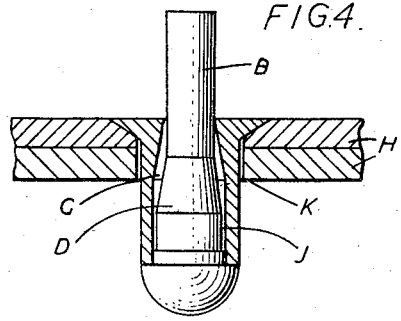
Figure 5:
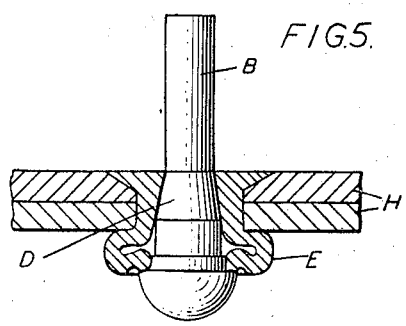
Figure 6:
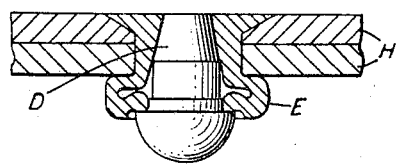

Referring now to the accompanying drawings in which Figure 1 is an elevation of one form of core constructed in accordance with this invention; Figure 2 is a sectional elevation of one form of tubular member constructed in accordance with this invention; Figure 3 shows the core and tubular member as depicted in Figures 1 and 2 respectively in assembled relationship and ready for use; Figure 4 shows the said core and tubular member placed in position in two plates to be riveted together and Figures 5 and 6 show two subsequent stages in the riveting operation.

The above figures are all drawn to an enlarged scale.

The shank of the headed core A is formed with two cylindrical portions B, C of different diameters with an intermediate tapered portion D. The internal surface of the headed tubular member E is partly cylindrical at F and tapered at G. The portion D of core A and the portion G of the tubular member E are of the same taper but if necessary these portions may be of different tapers.

For use the core and tubular member are assembled together as seen in Figure 3 as by welding or otherwise fixing the end of the member E to the underside of the head of the core A.

In Figures 4, 5 and 6, H, H indicate the two plates or members to be riveted together.

It will be seen in Figures 3 and 4 that there is an annular space J between the core A and member E and in Figure 4 also an annular space K between the member E and the walls of the rivet holes in the plates H, H.

In use the rivet as seen in Figure 3 is first inserted in the coincident holes in the plates H, H as seen in Figure 4. Then the shank B of the core is gripped by a known compression riveting tool and axial movement is imparted thereto whilst an opposing thrust is exerted against the head of the member E. This operation, as seen in Figure 5, causes the tubular member to collapse or be upset, eliminating the annular spaces J and K. Finally, the protruding shank B of the core is sheared off.

It will be seen that with the elimination of the said annular spaces or gaps the core and tubular member both act as one member and take the shear.

In the drawings the external surface of the tubular member E is shown as being cylindrical. However, if desired, this surface may be slightly tapered for convenience of manufacture and/or it may be chamfered at its extremity to assist its entry into the holes in the plates or the like to be riveted together. Further, the head of the tubular member E is depicted as a countersunk head but if desired said head may be rounded or of mushroom shape or of any other suitable shape.

In order to prevent the upper surface of the countersunk head of the tubular member E from becoming raised during the riveting action the said surface may be slightly dished.

I claim:

1. A rivet comprising in combination a headed tubular member adapted to extend through an opening within the structure to be riveted, the exterior diameter of said tubular member being less than the diameter of the opening within the structure to be riveted to form a space therebetween, the bore of said headed tubular member having a cylindrical portion and a tapered portion extending from said cylindrical portion to the headed end thereof, and the smaller diameter of said tapered portion terminating at the headed end of said tubular member, a headed core having a shank portion extending through the bore of said tubular member, a cylindrical portion formed with the shank of said core and of less exterior diameter than that of the interior diameter of the cylindrical portion of the bore of said tubular member leaving a space therebetween, a cylindrical portion formed with the shank of said core and of less diameter than that of the first mentioned cylindrical portion of the shank of said core, an intermediate tapered portion formed with the shank of said core and arranged between the cylindrical portions thereof whereby when axial forces are exerted upon the rivet said tubular member will first be collapsed to form a head about the headed end of said core and close the space between said core and tubular member and finally expand said tubular member to close the space between the latter and the structure to be riveted.

2. A rivet comprising in combination a tubular member adapted to extend through the structure to be riveted, a head formed with one end of said tubular member and adapted to be positioned against one face of the structure to be riveted, a core extending through said tubular member, a head formed with said core, means for securing the head of said core to said tubular member at an end thereof opposite to that to which said head is formed therewith, whereby when axial forces are extended upon said core the headed end thereof will first cause said tubular member to collapse to form a head adjacent the opposite face of the structure to be riveted, the bore of said tubular member having a tapered portion and said core having a tapered portion for cooperating only with the tapered portion of said tubular member for expanding said tubular member upon final axial movement of said core through said tubular member.

PIOTR KUBICKI.

REFERENCES CITED

The following references are of record in the file of this patent:

UNITED STATES PATENTS

| Number | Name | Date |
| --- | --- | --- |
| 2,038,189 | Morris | Apr. 21, 1936 |
| 2,061,629 | Huck | Nov. 24, 1936 |
| 2,114,493 | Huck | Apr. 19, 1938 |

FOREIGN PATENTS

| Number | Country | Date |
| --- | --- | --- |
| 378,617 | Great Britain | Aug. 18, 1932 |